(12) United States Patent
Sha et al.

(10) Patent No.: US 10,661,437 B2
(45) Date of Patent: May 26, 2020

(54) STOPPER APPARATUS, ROTARY JOINT AND ROBOT

(71) Applicant: ABB Schweiz AG, Baden (CH)

(72) Inventors: Jiajie Sha, Shanghai (CN); Xiaodong Cao, Shanghai (CN); Kaiyuan Cao, Shanghai (CN); Yun Ha, Shanghai (CN); Zhu Zhu, Shanghai (CN)

(73) Assignee: ABB Schweiz AG, Baden (CH)

( * ) Notice: Subject to any disclaimer, the term of this patent is extended or adjusted under 35 U.S.C. 154(b) by 181 days.

(21) Appl. No.: 15/962,326

(22) Filed: Apr. 25, 2018

(65) Prior Publication Data
US 2019/0118374 A1    Apr. 25, 2019

Related U.S. Application Data

(63) Continuation of application No. PCT/CN2015/099178, filed on Dec. 28, 2015.

(51) Int. Cl.
*B25J 9/10* (2006.01)
*B25J 17/00* (2006.01)

(52) U.S. Cl.
CPC .............. *B25J 9/101* (2013.01); *B25J 17/00* (2013.01)

(58) Field of Classification Search
CPC .............. B25J 9/101; B25J 17/00; B25J 19/00
See application file for complete search history.

(56) References Cited

U.S. PATENT DOCUMENTS 2,780,941 A    2/1957  Kollmorgen
3,717,231 A *  2/1973  Kaufeldt .................. B03C 3/00
                                                    192/139

(Continued)

FOREIGN PATENT DOCUMENTS

CN    102029617 A    4/2011
CN    103068534 A    4/2013
(Continued)

OTHER PUBLICATIONS

European Patent Office, Extended European Search Report in corresponding application No. 15911683.9, dated Jul. 18, 2019, 8 pp.

(Continued)

*Primary Examiner* — Thomas C Diaz
(74) *Attorney, Agent, or Firm* — Taft Stettinius & Hollister LLP; J. Bruce Schelkopf

(57) ABSTRACT

A stopper apparatus for robot rotary joint, for limiting the rotation angle of a turning shaft. The stopper apparatus includes: a rotary protrusion, fixed to the shaft and extended from an outer circumference surface of the shaft; a ring-like orbit, fixed to a mounting housing of the robot rotary joint, inserting the shaft therein; a first slider and a second slider, rotatably accommodated in the orbit and able to push each other to rotate; a stop protrusion, fixed to the housing of a robot rotary joint and extended in the direction of the center of the shaft; the rotary protrusion is able to directly push the second slider to rotate, while it is not able to directly push the first slider to rotate; the shaft, the rotary protrusion and the second slider cannot be obstructed by the stop protrusion when rotate, while the first slider is able to be obstructed by the stop protrusion when rotate, thereby the relative rotation between the shaft and the housing can be stopped. The present invention also provides a rotary joint and a robot. Compared with the existing prior arts, the proposed solution enables a rotation range larger than ±360 degrees.

20 Claims, 8 Drawing Sheets

(56) References Cited

U.S. PATENT DOCUMENTS

| | | | |
|---|---|---|---|
| 4,751,986 A | 6/1988 | Takahashi | |
| 8,920,060 B2 * | 12/2014 | Maekita | A61F 5/0102 192/139 |
| 2005/0204849 A1 | 9/2005 | Yamamoto et al. | |
| 2011/0072918 A1 | 3/2011 | Reekers | |
| 2014/0331807 A1 | 11/2014 | Kitahara et al. | |

FOREIGN PATENT DOCUMENTS

| | | |
|---|---|---|
| DE | 29616401 U1 | 10/1997 |
| JP | H01135487 A | 5/1989 |
| JP | 0215991 A | 1/1990 |
| JP | H0366585 A | 3/1991 |
| JP | H05177579 A | 7/1993 |
| JP | H0768485 A | 3/1995 |
| JP | 07136972 A | 5/1995 |
| JP | H11333777 A | 12/1999 |

OTHER PUBLICATIONS

State Intellectual Property Office of the P.R. China, International Search Report & Written Opinion issued in corresponding Application No. PCT/CN2015/099178, dated Sep. 6, 2016, 9 pp.

* cited by examiner

STOPPER APPARATUS, ROTARY JOINT AND ROBOT

FIELD OF THE INVENTION

Embodiments of the present disclosure generally relate to a stopper apparatus, and particularly relate to a stopper apparatus for use in a rotary joint, a rotary joint and a robot comprising the rotary joint.

BACKGROUND OF THE INVENTION

A commonly used multi-axis industrial robot includes a mounting cover, a turning flange which turns around an axis over the mounting cover, and a robot arm which is mounted on the turning flange. A stopper is attached to the mounting cover and the turning flange for the purpose of mechanically limiting the operating angle of the turning flange when the rotation angle reaches a preset limit.

As shown in FIG. 1, a mechanical stopper is installed on the robot housing unit 1 of a rotary joint. A circular orbit 2 and a stop dog 5, which is further shown in FIG. 2, are installed on a cover 8, which is fixed on the robot body by bolts. A single slider 10, which is further shown in FIG. 3, is placed between the circular orbit 2 and a rotation flange 3. A bolt 4 is plugged in the rotation flange 3.

The problem of the foregoing existing technique is that the limit of the operating angle of the turning angle cannot be set to a value in the vicinity of or beyond ±360 degrees. More specifically, when the rotation flange 3 begins to rotate, the bolt 4 moves along with the flange 3. When the bolt 4 moves to the position against the slider 10, it pushes the slider 10 moves forward until they are obstructed by the stop dog 5. In this case, the rotation angle is 360 degrees-ω (ω is shown in FIG. 1). If the rotation flange 3 rotates in an opposite direction, the result is the same. Therefore, the rotation angle range for this mechanical stopper is ±(360−ω) degrees. That is, the operating angle of the turning flange 3 cannot be set to a value of 360 degrees or more. Further, even if the operating angle is set to a value less than 360 degrees, it is difficult to set the operating angle to a value close to 360 degrees.

Generally, limited by the cable performance and structure of mechanical stopper, the robot joint cannot rotate 360 degrees or more in a single direction. However, in some actual working applications, a wide-angle rotation, that is, a whole 360 degrees circle or more, is required by the robot joint. As a matter of course, elimination of the stopper can also be selected. However, in order to protect a drive cable or the like (not shown) of the robot arm connected between the mounting cover 8 and the turning flange 3, the operating angle of the turning flange 3 must be mechanically limited.

Therefore, there is a demand for a stopper capable of setting the limit of operating angle of the turning flange 3 to a value of ±360 degrees or more.

SUMMARY OF THE INVENTION

To resolve the problem of small rotation angle of the robot joint, an object of the present invention is to provide a stopper for use with an industrial robot capable of setting the limit of operating angle of a turning flange to a value of ±360 degrees or more.

To accomplish the foregoing object, according to one aspect of the invention, there is provided a stopper apparatus for robot rotary joint, for limiting the rotation angle of a turning shaft. The stopper apparatus comprises: a rotary protrusion, fixed to the shaft and extended from an outer circumference surface of the shaft; an ring-like orbit, fixed to a mounting housing of the robot rotary joint, inserting the shaft therein; a first slider and a second slider, rotatably accommodated in the orbit and able to push each other to rotate; a stop protrusion, fixed to the housing of a robot rotary joint and extended in the direction of the center of the shaft; wherein, the rotary protrusion is able to directly push the second slider to rotate, while it is not able to directly push the first slider to rotate; the shaft, the rotary protrusion and the second slider cannot be obstructed by the stop protrusion when rotate, while the first slider is able to be obstructed by the stop protrusion when rotate, thereby the relative rotation between the shaft and the housing can be stopped.

According to a preferred embodiment of the present invention, the first slider has a groove with its opening towards the center of the shaft, to allow the rotary protrusion to pass through; and the second slider has a groove with its opening opposite to the center of the shaft, to allow the stop protrusion whose free end is in a T-shape to pass through.

According to a preferred embodiment of the present invention, the first slider is in a U-shape; and the second slider is in an inversed U-shape.

According to a preferred embodiment of the present invention, the first slider is in an inversed T shape, to allow the rotary protrusion which has a groove with its opening opposite to the center of the shaft to pass through; and the second slider is in a T shape, to allow the stop protrusion which has a groove with its opening towards the center of the shaft to pass through.

According to a preferred embodiment of the present invention, the free end of the rotary protrusion is in an inversed U-shape; and the free end of the stop protrusion is in an inversed U-shape.

According to a preferred embodiment of the present invention, the rotary protrusion is a bolt which is engaged with a screw hole of the shaft.

According to a preferred embodiment of the present invention, the stop protrusion is installed on the housing by at least one screw.

According to a preferred embodiment of the present invention, the first slider and the second slider can be provided at arbitrary positions around the turning shaft.

According to a preferred embodiment of the present invention, the rotary protrusion and the shaft are integrally formed.

According to a preferred embodiment of the present invention, the stop protrusion and the housing are integrally formed.

According to a preferred embodiment of the present invention, the operating angle range of the turning shaft is more than ±360 degrees.

According to a preferred embodiment of the present invention, the operating angle range of the turning shaft is less than ±540 degrees.

According to a preferred embodiment of the present invention, the central angle of the first slider, the second slider, the stop protrusion and the rotary protrusion is α, β, γ, and θ, respectively, and the operating angle range of the turning shaft is from ±[540−(α+β+γ/2+θ)] degrees.

According to another aspect of the invention, there is provided a rotary joint comprising the stopper apparatus as described above.

According to another aspect of the invention, there is provided a robot comprising the rotary joint as described above.

Compared with the existing prior arts, the present invention can provide a wide-angle rotation-capable mechanical stopper. The mechanical stopper has a wider rotation range, which is much more than ±360 degrees. It enables the robot wrist to have a more flexible rotary movement, reducing turning times and improving working efficiency. It can also be easily programmed to have the robot wrist to rotate more than ±360 degrees in some specific applications rather than to adjust the robot position to achieve a whole-circle movement.

Other features and advantages of embodiments of the present application will also be understood from the following description of specific exemplary embodiments when read in conjunction with the accompanying drawings, which illustrate, by way of example, the principles of the invention.

BRIEF DESCRIPTION OF THE DRAWINGS

The above and other features of the present disclosure will become more apparent through detailed explanation on the embodiments as illustrated in the description with reference to the accompanying drawings, throughout which like reference numbers represent same or similar components and wherein.

Throughout the figures, same or similar reference numbers indicate same or similar elements.

DETAILED DESCRIPTION OF PREFERRED EMBODIMENTS

Hereinafter, solutions as provided the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner.

Generally, all terms used in the claims are to be interpreted according to their ordinary meaning in the technical field, unless explicitly defined otherwise herein. All references to "a/an/the/said [element, device, component, means, step, etc]" are to be interpreted openly as referring to at least one instance of said element, device, component, means, unit, step, etc., without excluding a plurality of such devices, components, means, units, steps, etc., unless explicitly stated otherwise. Besides, the indefinite article "a/an" as used herein does not exclude a plurality of such steps, units, modules, devices, and objects, and etc.

In general, embodiments of the present application provide a new stopper apparatus for a robot joint. As will be apparent from the further discussions below, two sliders and two protrusions are employed to provide a wide-range stopper apparatus.

Figure 4:
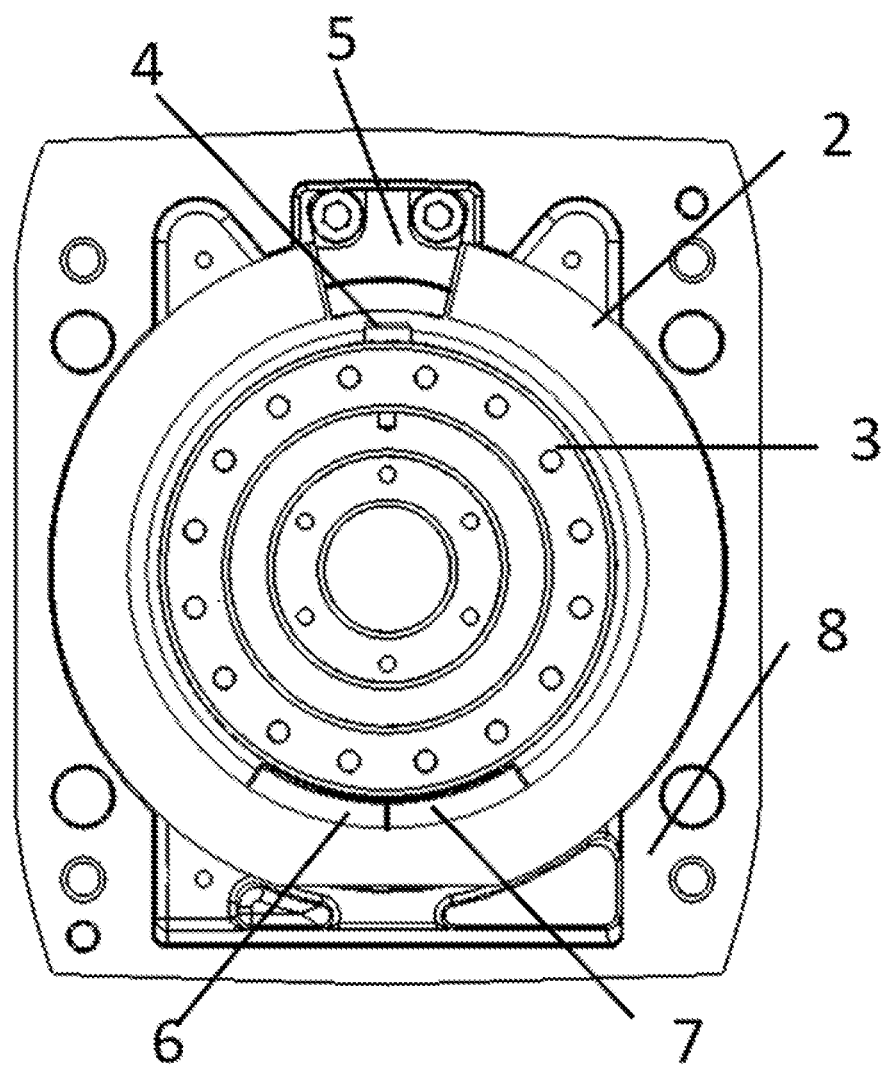
FIG. 4 is a front view showing the principal elements of the stopper according to an embodiment of the present disclosure.

Referring to FIG. 4, one embodiment of a rotary joint of an industrial robot generally includes a mounting housing 8, a turning shaft 3 rotatable relative to the mounting housing 8, and a stopper to mechanically limit an operating angle of the turning shaft 3. The industrial robot can be a multi-axis robot, e.g. a six-axis robot. Other components of the industrial robot, such as one or more electric motors, one or more arms, one or more links, and drive cables or the like are not shown.

Throughout the descriptions of various embodiments of the present application, repeated descriptions of some similar elements will be omitted.

Next, reference will be made to describe an example of the stopper apparatus, for limiting the rotation angle of a turning shaft, in the rotary joint of a robot in which the first embodiment of the present disclosure can be implemented. A portion of a robotic system having multiple types of rotary joints. The robot has a controller and a plurality of articulated arms respectively provided with electric motors to drive the arms. Each joint may have different characteristics, freedom of movement (e.g., range of motion or degrees of freedom), and/or package space; therefore, stopper apparatus passing through the joints generally require special designs adapted to the particular joint type. In accordance with embodiments of the present invention, the same basic configuration may be applied to common joints, to make the rotary joints to work over wide range, such as over ±360 degrees.

With reference to FIG. 4, a stopper apparatus may be used for a rotary joint, to facilitate rotation and limit the rotation angle from a first angular position to a second angular position. The joint is connected to an articulated arm, which includes two rotary portions allowing the arm to rotate on the axis given thereto, namely, a mounting housing 8, and a turning shaft 3, which rotates relative to one another. The mounting housing 8 is fixed and the turning shaft 3 is rotatable.

In general, the stopper apparatus comprises a rotary protrusion 4, fixed to the shaft 3 and extended from an outer circumference surface of the shaft 3; an ring-like orbit 2, fixed to a mounting housing 8 of the robot rotary joint 1, inserting the shaft 3 therein; a slider 6 and a slider 7, rotatably accommodated in the orbit 2 and able to push each other to rotate; and a stop protrusion 5, fixed to the housing 8 of a robot rotary joint 1 and extended in the direction of the center of the shaft 3. The rotary protrusion 4 is able to directly push the slider 7 to rotate, while it is not able to directly push the slider 6 to rotate.

According to the some embodiments, the slider 6 has a groove with its opening towards the center of the shaft 3, to allow the rotary protrusion 4 to pass through. One variant is that the slider 6 is in an inversed T shape, to allow the rotary protrusion 4 which has a groove with its opening opposite to the center of the shaft 3 to pass through.

The shaft 3, the rotary protrusion 4 and the slider 7 cannot be obstructed by the stop protrusion 5 when rotate. For example, the slider 7 has a groove with its opening opposite to the center of the shaft 3, to allow the stop protrusion 5 whose free end is in a T-shape to pass through. Or the slider 7 is in a T shape, to allow the stop protrusion 5 which has a groove with its opening towards the center of the shaft 3 to pass through. However, the slider 6 is able to be obstructed by the stop protrusion 5 when rotate, thereby the relative rotation between the shaft 3 and the housing 8 can be stopped.

According to the some embodiments, the rotary protrusion 4 can be a bolt which is engaged with a screw hole of the shaft 3. It should also be appreciated that the rotary protrusion 4 and the shaft 3 can be integrally formed.

According to the some embodiments, the stop protrusion 5 can be installed on the housing 8 by at least one screw. It should also be appreciated that the stop protrusion 5 and the housing 8 can be integrally formed.

Furthermore, according to the some embodiments, the slider 6 and the slider 7 can be provided at arbitrary positions around the turning shaft 3.

Figure 1:
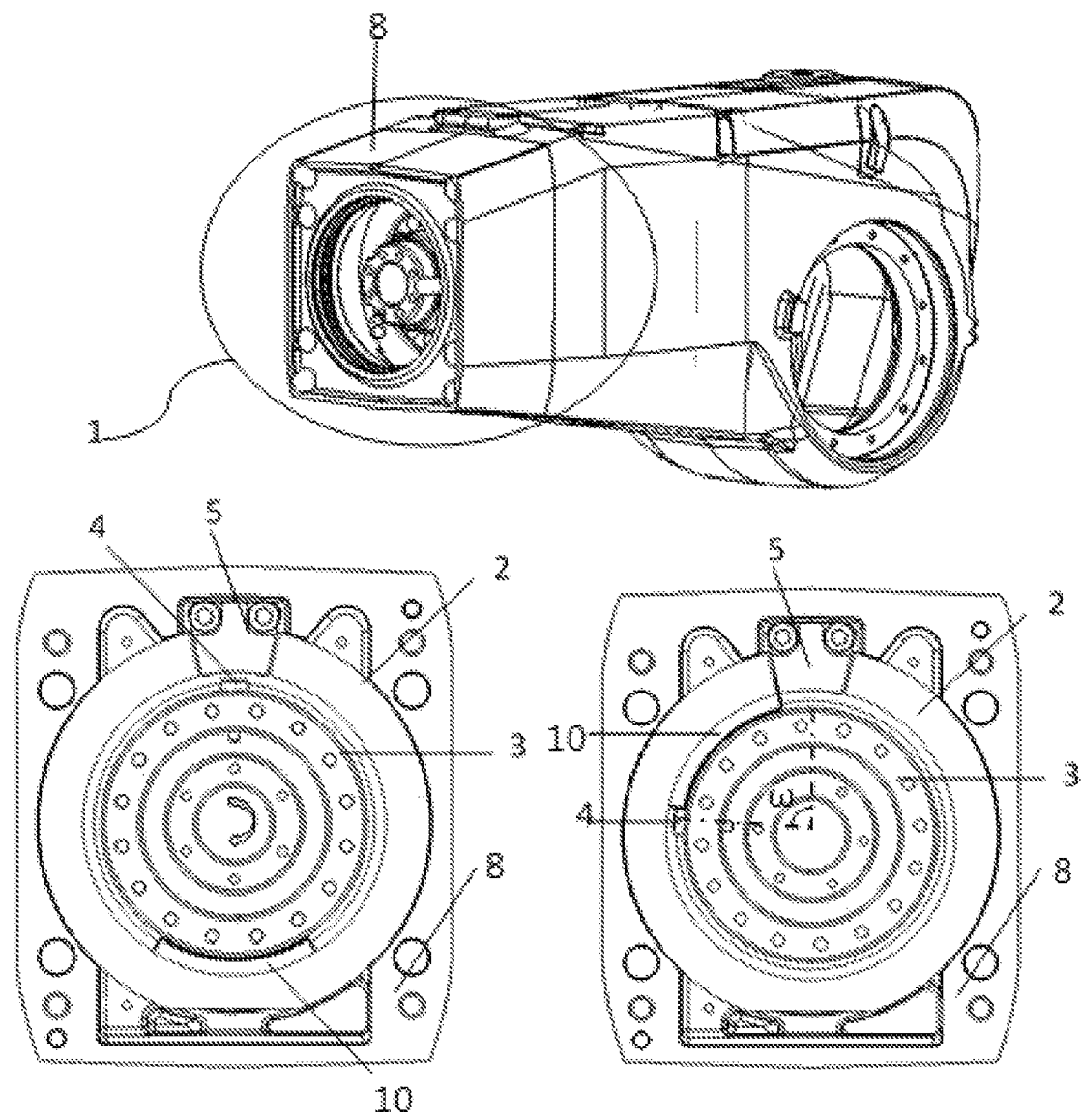
FIG. 1 shows an existing stopper in the rotary joint.
Figure 2:
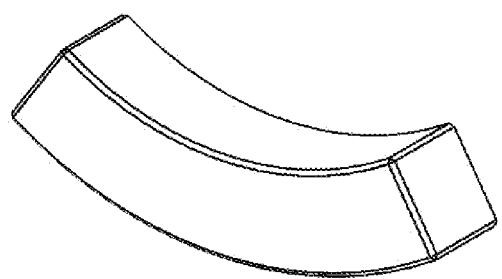
FIG. 2 shows a perspective view of the slider according to the existing stopper in FIG. 1.
Figure 3:
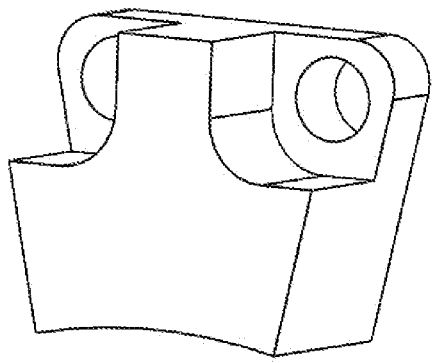
FIG. 3 shows a perspective view of the stop dog according to the existing stopper in FIG. 1.
Figure 5:
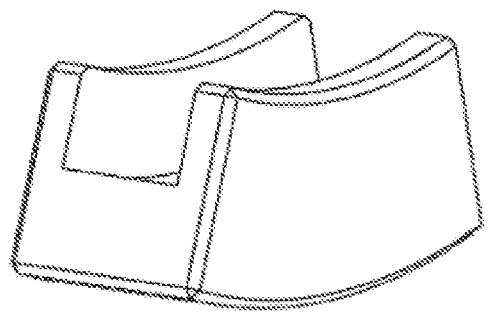
FIG. 5 shows a perspective view of the first slider according to an embodiment of the present disclosure.
Figure 6:
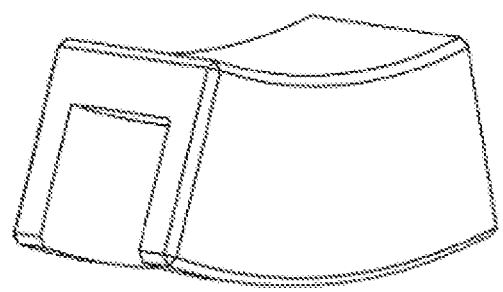
FIG. 6 shows a perspective view of the second slider according to an embodiment of the present disclosure.
Figure 7:
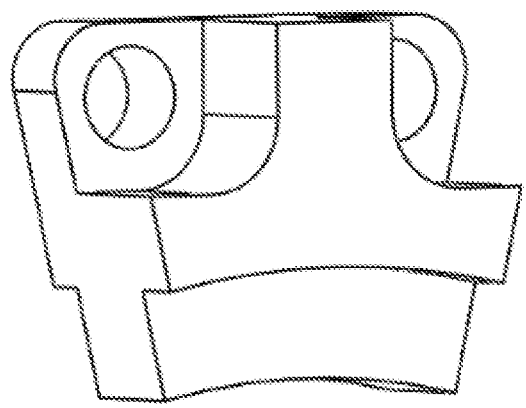
FIG. 7 shows a perspective view of the stop protrusion according to an embodiment of the present disclosure.

The working principle of the stopper apparatus of the some embodiments will be further discussed below. Compared to the existing stopper as shown in FIGS. 1-3, the original single slider 10 is separated into two sliders, the U-shape slider 6 and the inversed U-shape slider 7 respectively, as shown in FIGS. 5 and 6. The stop protrusion 5 is then designed into T-shape as shown in FIG. 7. The groove of the U-shape sliders 6, 7 matches the protruded part of the T-shape stop protrusion 5. More specifically, the protruded part of the stop protrusion 5 can pass through the groove of the slider 7. The two sliders are installed in reserve direction. This allows one slider to pass through the stop protrusion 5 while the other to be stopped by the stop protrusion 5. A rotation range larger than ±360 degrees and smaller than ±540 degrees can be achieved.

Hereinafter, to make the skilled in the art to understand the solution as provided in the present disclosure completely and thoroughly, reference will be made to FIGS. 8-10 to explain the counter-clockwise and clockwise operation of the stopper apparatus, to show how it can realize more than ±360 degrees as provided in embodiments of the present disclosure.

Figure 8:
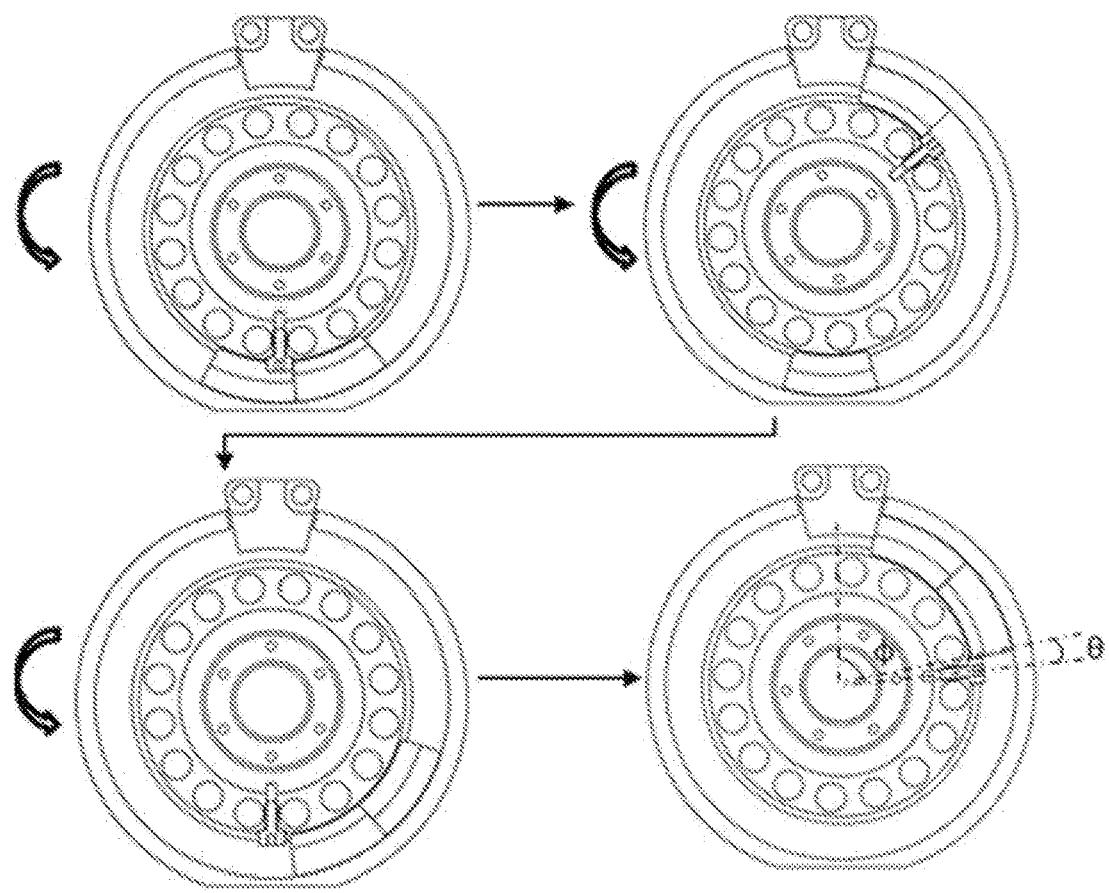
FIG. 8 is a front view showing the counter-clockwise operation of the stopper according to an embodiment of the present disclosure.
Figure 9:
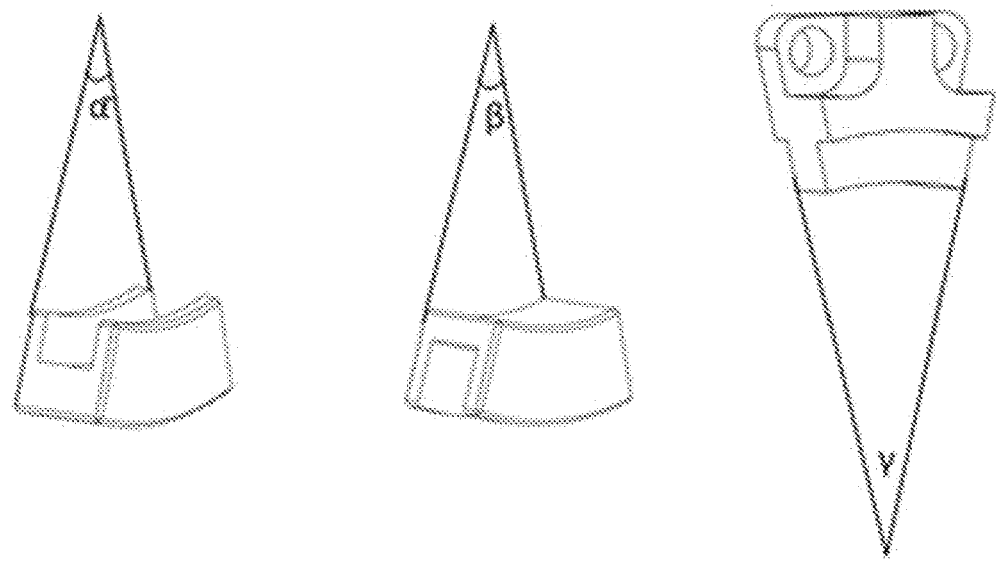
FIG. 9 respectively shows the center angle of the principal elements of the stopper according to an embodiment of the present disclosure.

As shown in FIG. 8, when the rotation shaft 3 runs counter-clockwise, the bolt 4 moves together. When the bolt 4 moves to the position of the slider 6, it will not be obstructed by the slider 6 as original but passes through the groove of the slider 6. Since the slider 6 is inversed with the slider 7, the bolt 4 will push the slider 7 to move forward. When they reach the position of the stop protrusion 5, the protruded part of the stop protrusion 5 passes through the groove of the slider 7. Therefore, the slider 7 moves ahead without stopping by the stop protrusion 5. When the slider 7 reaches the other side of the slider 6, it will push the slider 6 to rotate together until the slider 6 is stopped by the stop protrusion. At the time that the sliders are stopped, the slider 7 has already passed its original position and rotated more than 360 degrees.

More specifically, the bolt 4 has a curve design with the central angle $\theta$ as shown in FIG. 8. The sliders 6, 7 and the stop protrusion 5 have a curve design with the central angle $\alpha$, $\beta$ and $\gamma$, as shown in FIG. 9, respectively. In this case, when the rotation shaft runs counter-clockwise, the rotation angle range is 540-$\varphi$ degrees (in which, $\varphi=\alpha+\beta+\gamma/2+\theta$).

Figure 10:
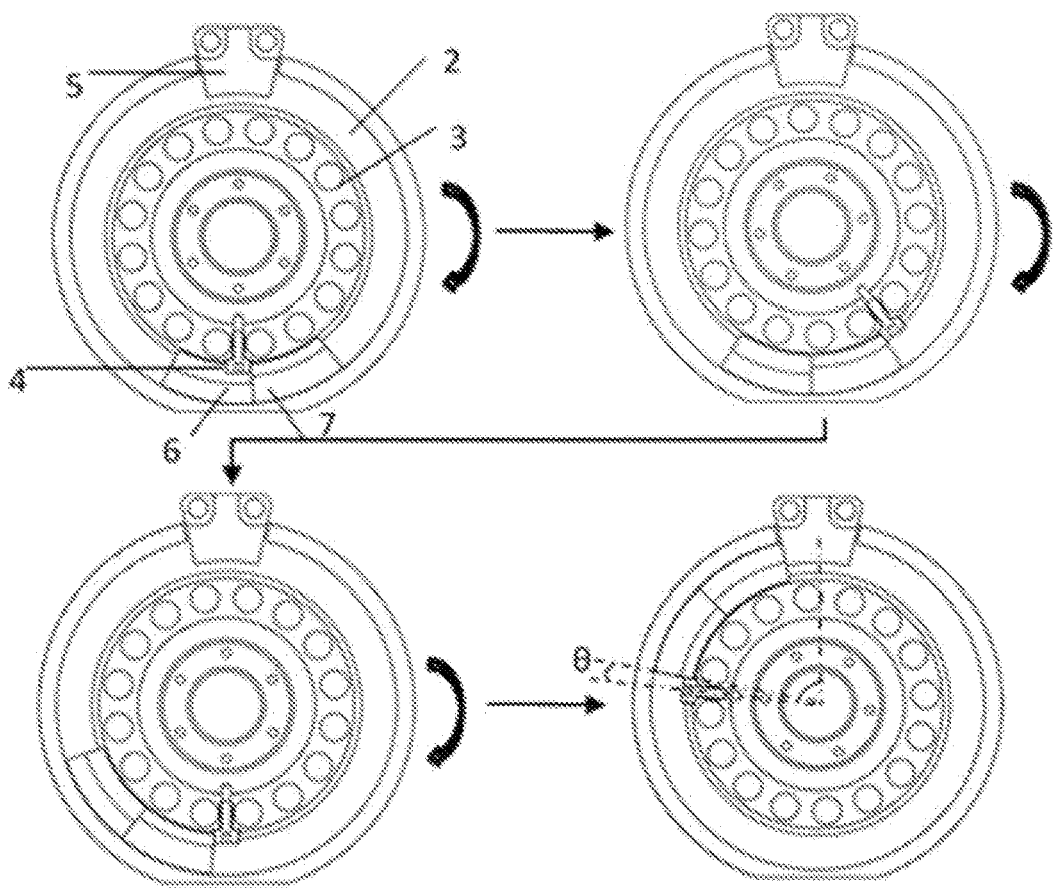
FIG. 10 is a front view showing the clockwise operation of the stopper according to an embodiment of the present disclosure.

If the rotation shaft runs clockwise as shown in FIG. 10, the bolt 4 encounters the slider 7 firstly and pushes both sliders move forward until they are stopped by the stop protrusion 5. In this case, the rotation angle range is also 540-$\varphi$ degrees (in which, $\varphi=\alpha+\beta+\gamma/2+\theta$).

That is, the rotation range of this mechanical stopper is ±(540−$\varphi$) degrees and the value of $\varphi$ depends on the values of $\alpha$, $\beta$, $\gamma$ and $\theta$. The smaller the values of $\alpha$, $\beta$, $\gamma$, and $\theta$ are, the smaller the value of $\varphi$ is and the larger the rotation range can achieve.

Therefore, as described above, a rotation range larger than ±360 degrees and smaller than ±540 degrees can be achieved. A wider rotation range enables the robot wrist to have a more flexible rotary movement, reducing turning times and improving working efficiency. It can also be easily programmed to have the robot wrist to rotate more than ±360 degrees in some specific applications rather than to adjust the robot position to achieve a whole-circle movement.

The above describes one kind of stopper apparatus, but its structure is not limited to the above, and it can also adopt, but not limited to, other structures as described below.

Figure 11:
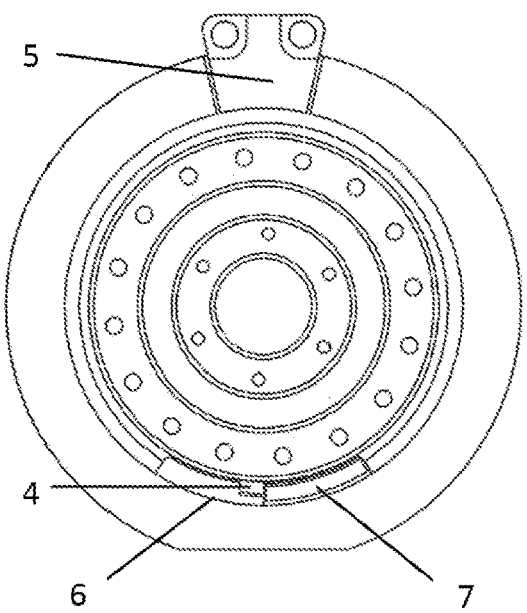
FIG. 11 is a front view showing the principal elements of the stopper according to another embodiment of the present disclosure.
Figure 12:
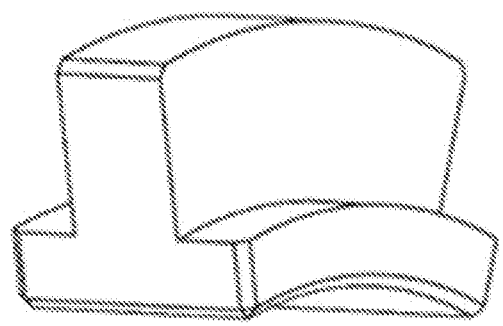
FIG. 12 shows a perspective view of the first slider according to another embodiment of the present disclosure.
Figure 13:
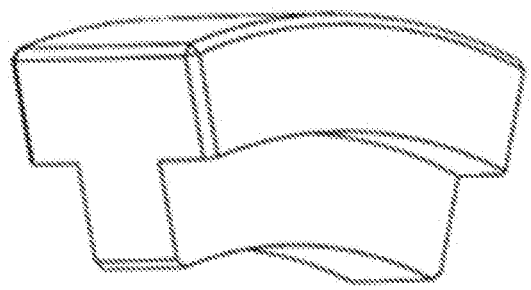
FIG. 13 shows a perspective view of the second slider according to another embodiment of the present disclosure.
Figure 14:
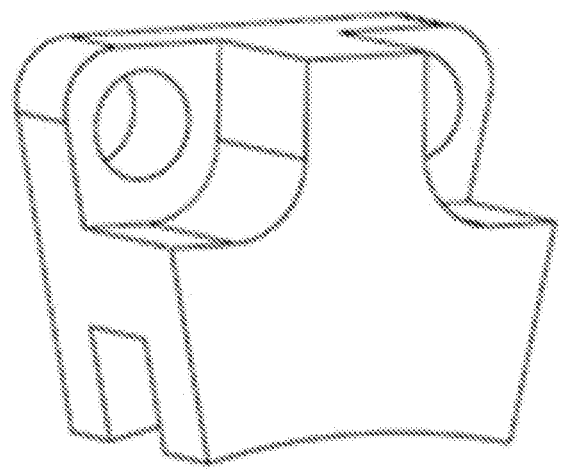
FIG. 14 shows a perspective view of the stop protrusion according to another embodiment of the present disclosure.
Figure 15:
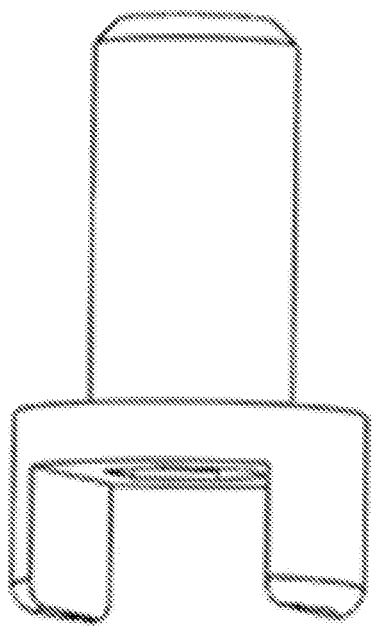
FIG. 15 shows a perspective view of the rotary protrusion according to another embodiment of the present disclosure.

According to the present application, the solution for the mechanical stopper is based on the special design of forms of the sliders and stop protrusion, and there are also other form variants available for choosing in different situations. For example, in another embodiment of the present application, the sliders can be designed as an inversed T-shape 6 slider and a T-shape slider 7, and the stop protrusion 5 can be designed as an inversed U-shape as shown in FIGS. 12-14. A circular orbit 2 and a T-shape stop protrusion 5 are installed on cover 8, which is fixed on the robot body by bolts, as shown in FIG. 11. The sliders 6, 7 are placed between the circular orbit 2 and the rotation shaft 3. A bolt 4 is plugged in the rotation shaft 3. In this case, the protruded part of the T-shape slider 7 will pass through the groove of the U-shape stop protrusion 5. This can achieve the same effect as mentioned before. In this solution, the bolt 4 should also be re-designed to have an inversed U-shape head, as shown in FIG. 15, so that it will not be obstructed by the inversed T-shape slider 6.

Figure 16:
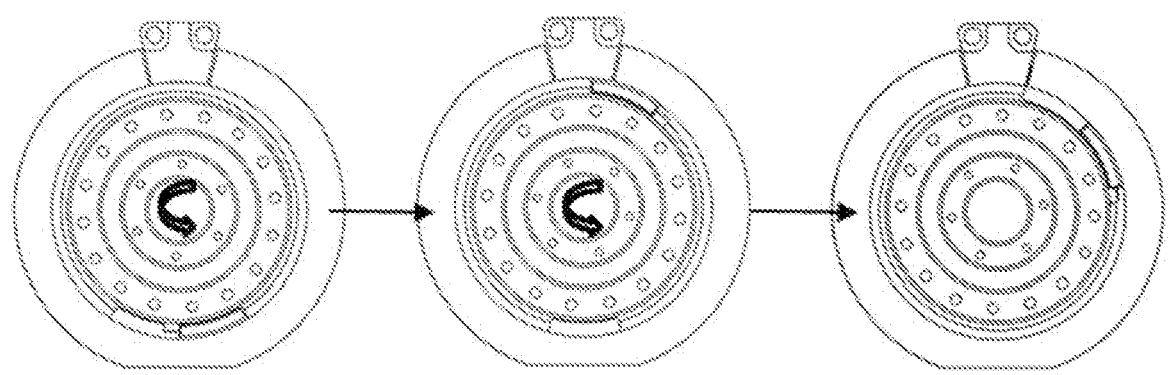
FIG. 16 is a front view showing the counter-clockwise operation of the stopper according to another embodiment of the present disclosure.

As shown in FIG. 16, when the rotation shaft 3 runs counter-clockwise, the bolt 4 passes through the slider 6 and pushes the slider 7 to move forward. Originally, they will be stopped when the slider touches the stop protrusion 5. But now, the slider 7 will not be stopped by the stop protrusion since they are staggered. The slider 7 will move ahead and pushes the slider 6 to move together when they meet until the slider 6 is stopped by the stop protrusion 5. In this case, the shaft rotates more than one circle, namely, a rotation range larger than ±360 degrees and smaller than ±540 degrees can also be achieved.

Hereinabove, embodiments of the present disclosure have been described in details through embodiments with reference to the accompanying drawings. It should be appreciated that, while this specification contains many specific implementation details, these details should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purposes of limitation.

The invention claimed is:

1. A stopper apparatus for robot rotary joint, for limiting the rotation angle of a turning shaft, the stopper apparatus comprises:
   a rotary protrusion, fixed to the shaft and extended from an outer circumference surface of the shaft;
   a circular orbit, fixed to a mounting housing of the robot rotary joint, inserting the shaft therein;
   a first slider and a second slider, rotatably accommodated in the orbit and able to push each other to rotate;
   a stop protrusion, fixed to the housing of a robot rotary joint and extended in the direction of the center of the shaft; wherein,
   the rotary protrusion is able to directly push the second slider to rotate, while it is not able to directly push the first slider to rotate;
   the shaft, the rotary protrusion and the second slider cannot be obstructed by the stop protrusion when rotated, while the first slider is able to be obstructed by the stop protrusion when rotated, thereby the relative rotation between the shaft and the housing can be stopped; wherein
   the first slider has a groove with its opening towards the center of the shaft, to allow the rotary protrusion to pass through; and
   the second slider has a groove with its opening opposite to the center of the shaft, to allow the stop protrusion whose free end has a T-shape to pass through.

2. The stopper apparatus according to claim 1, wherein the first slider has a U-shape; and the second slider has an inversed U-shape.

3. The stopper apparatus according to claim 1, wherein the rotary protrusion is a bolt which is engaged with a screw hole of the shaft.

4. The stopper apparatus according to claim 1, wherein the stop protrusion is installed on the housing by at least one screw.

5. The stopper apparatus according to claim 1, wherein the first slider and the second slider can be provided at arbitrary positions around the turning shaft.

6. The stopper apparatus according to claim 1, wherein the rotary protrusion and the shaft are integrally formed.

7. The stopper apparatus according to claim 1, wherein the stop protrusion and the housing are integrally formed.

8. The stopper apparatus according to claim 1, wherein the operating angle range of the turning shaft is more than ±360 degrees.

9. The stopper apparatus according to claim 8, wherein the operating angle range of the turning shaft is less than ±540 degrees.

10. The stopper apparatus according to claim 9, wherein the central angle of the first slider, the second slider, the stop protrusion and the rotary protrusion is $\alpha$, $\beta$, $\gamma$, and $\theta$, respectively, and
    the operating angle range of the turning shaft is from $\pm[540-(\alpha+\beta+\gamma/2+\theta)]$ degrees.

11. A rotary joint comprising the stopper apparatus according to claim 1.

12. A robot comprising the rotary joint according to claim 11.

13. A stopper apparatus for robot rotary joint, for limiting the rotation angle of a turning shaft, the stopper apparatus comprises:
    a rotary protrusion, fixed to the shaft and extended from an outer circumference surface of the shaft;
    a circular orbit, fixed to a mounting housing of the robot rotary joint, inserting the shaft therein;
    a first slider and a second slider, rotatably accommodated in the orbit and able to push each other to rotate;
    a stop protrusion, fixed to the housing of a robot rotary joint and extended in the direction of the center of the shaft; wherein,
    the rotary protrusion is able to directly push the second slider to rotate, while it is not able to directly push the first slider to rotate;
    the shaft, the rotary protrusion and the second slider cannot be obstructed by the stop protrusion when rotated, while the first slider is able to be obstructed by the stop protrusion when rotated, thereby the relative rotation between the shaft and the housing can be stopped; wherein
    the first slider has an inversed T-shape, to allow the rotary protrusion which has a groove with its opening opposite to the center of the shaft to pass through; and
    the second slider has a T-shape, to allow the stop protrusion which has a groove with its opening towards the center of the shaft to pass through.

14. The stopper apparatus according to claim 13, wherein the free end of the rotary protrusion has an inversed U-shape; and the free end of the stop protrusion has an inversed U-shape.

15. The stopper apparatus according to claim 13, wherein the first slider and the second slider can be provided at arbitrary positions around the turning shaft.

16. The stopper apparatus according to claim 13, wherein the operating angle range of the turning shaft is more than ±360 degrees.

17. The stopper apparatus according to claim 16, wherein the operating angle range of the turning shaft is less than ±540 degrees.

18. The stopper apparatus according to claim 17, wherein the central angle of the first slider, the second slider, the stop protrusion and the rotary protrusion is $\alpha$, $\beta$, $\gamma$, and $\theta$, respectively, and the operating angle range of the turning shaft is from ±[540−(α+β+γ/2+θ)] degrees.

19. A rotary joint comprising the stopper apparatus according to claim 13.

20. A robot comprising the rotary joint according to claim 19.

* * * * *